US005802067A

United States Patent [19]

Kimura et al.

[11] Patent Number: 5,802,067

[45] Date of Patent: Sep. 1, 1998

[54] FM MULTIPLEX BROADCAST RECEIVING CIRCUIT FOR DETECTING PRESENCE OR ABSENCE OF MULTIPLEX INFORMATION

[75] Inventors: Kazuhiro Kimura, Fukaya; Shigeaki Hayashibe, Gunma-ken; Yutaka Hirakoso, Gyoda; Takahiko Masumoto, Gunma-ken; Shizuka Ishimura, Gunma-ken; Toshiyuki Ozawa, Ota; Munehiro Suka, Katsushika-ku, all of Japan

[73] Assignee: Sanyo Electric Co., Ltd., Osaka, Japan

[21] Appl. No.: 614,466

[22] Filed: Mar. 12, 1996

[30] Foreign Application Priority Data

Mar. 16, 1995 [JP] Japan .................................... 7-057394

[51] Int. Cl.[6] ........................................................ H04J 3/12

[52] U.S. Cl. ............................................. 370/527; 370/503

[58] Field of Search ..................................... 370/514, 513, 370/512, 504, 503, 498, 532–537, 527, 529, 524, 522, 509, 241, 320, 329, 330, 331, 332, 335, 344, 350, 535; 375/334, 335, 346, 355, 356, 366, 367, 239; 455/3.2, 5.1, 502, 501, 86, 87, 85, 77

[56] References Cited

U.S. PATENT DOCUMENTS 5,241,687 8/1993 Short ........................................ 455/45

5,390,344 2/1995 Nagata .................................. 455/222

FOREIGN PATENT DOCUMENTS

| | | |
|---|---|---|
| 0066037 | 12/1982 | European Pat. Off. . |
| 503202 | 9/1992 | European Pat. Off. . |
| 653857 | 5/1995 | European Pat. Off. . |
| 3934282 | 4/1990 | Germany . |
| 4231121 | 9/1992 | Germany . |
| 3104323 | 5/1991 | Japan . |
| 8503824 | 8/1985 | WIPO . |

OTHER PUBLICATIONS

European Search Report, dated Jun. 10, 1996, Appl. No. 96301732.2.

*Primary Examiner*—Dang Ton

*Attorney, Agent, or Firm*—Loeb & Loeb LLP

[57] ABSTRACT

In accordance with the operation of an operating section 14, a control section 12 performs a reception control operation and demodulates a signal passing through a band pass filter 7 for extracting a multiplex signal using a multiplex signal demodulating section 8 when receiving a broadcast signal. A block synchronization circuit 16 of a synchronization circuit 9 carries out block synchronization processing on the demodulated signal. When block synchronization is established, a synchronization determination signal is supplied to a detecting section DET and the detecting section DET determines that a broadcasting station whose radio waves are currently being received is a multiplex broadcasting station.

36 Claims, 7 Drawing Sheets

FM MULTIPLEX BROADCAST RECEIVING CIRCUIT FOR DETECTING PRESENCE OR ABSENCE OF MULTIPLEX INFORMATION

BACKGROUND OF THE INVENTION

1. Field of the Invention

The present invention relates to an FM multiplex broadcast receiving circuit for receiving an FM multiplex signal in which a digital information signal is superimposed on an FM broadcast signal, and also to a receiver using such a circuit.

2. Description of the Prior Art

A RDS (radio data system) used in Europe has hitherto been known as a system for superimposing other information on an FM broadcast signal and transmitting the resultant signal.

A receiver for receiving an FM multiplex broadcast, such as an RDS broadcast, decides whether a broadcast signal currently being received is a multiplex broadcast or not by detecting the presence or absence of multiplex information. In general, the receiver decides this in accordance with the level of an output of an integration and discharge circuit of a decoder for demodulating multiplex information, as disclosed in the official gazette of Japanese Patent Laid-Open No. 104323/1991 (JP-A-03104323).

However, when a receiver is constituted so as to detect the presence or absence of multiplex broadcast in accordance with only the output level of an integration and discharge circuit like the above prior art, there is possibility of erroneous detection due to interference in a propagation path, such as multipath noise.

SUMMARY OF THE INVENTION

To solve the above problem, the present invention comprises an FM multiplex broadcast receiving circuit for receiving an FM multiplex signal in which a digital information signal is superimposed on an FM broadcast signal, provided with detection means for detecting multiplex broadcast in accordance with the received digital information signal.

Moreover, the present invention comprises multiplex information detection means for detecting whether an FM broadcast signal includes multiplex information or not, and multipath detection means for detecting the presence of a multipath component.

The present invention makes it possible to achieve a secure detecting operation because multiplex information is detected in accordance with digital information.

Moreover, because a multiplex signal can temporarily be detected by detecting a subcarrier signal, it is possible to search for a multiplex station in a short time.

Furthermore, it is possible to prevent erroneous detection when multipath noise is received.

DETAILED DESCRIPTION OF THE PREFERRED EMBODIMENTS

Figure 1:
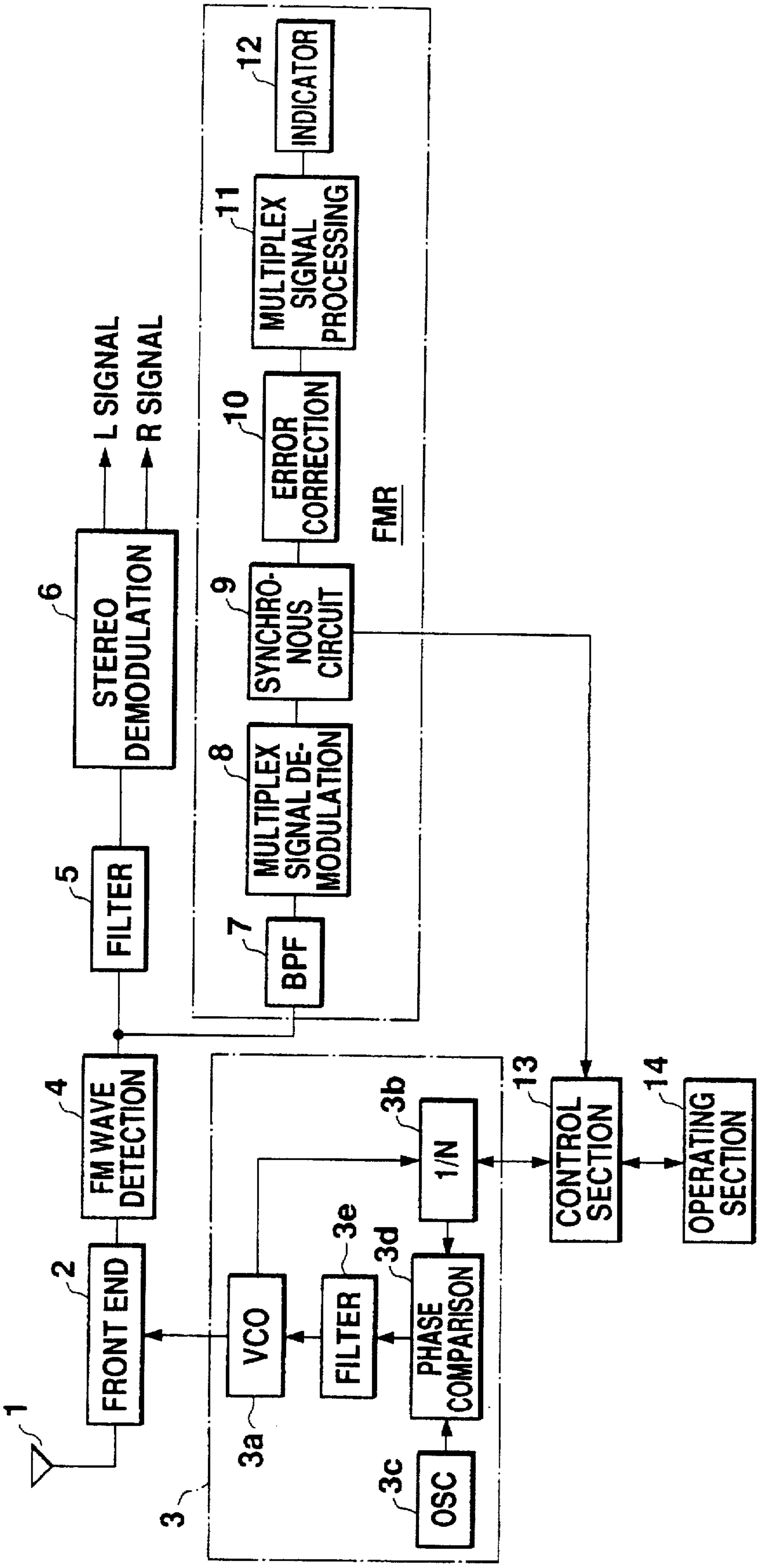
FIG. 1 is an illustration showing a first embodiment of the present invention.

FIG. 1 is an illustration showing an embodiment of the present invention, in which numeral 1 denotes an antenna, 2 denotes a front end for receiving a high-frequency signal from the antenna 1 and converting the signal into a predetermined intermediate-frequency (IF) signal, and 3 denotes a phase-locked loop (PLL) circuit for supplying a synchronized signal to the front end 2. The phase lock loop circuit 3, as is generally known, comprises a voltage controlled oscillator (VCO) 3a for outputting a local oscillation signal, a 1/N frequency divider 3b for dividing an output of the VCO at a frequency dividing ratio N (N is a positive integer), a reference frequency oscillator (OSC) 3c, a phase comparator 3d for comparing the phase of a frequency-divided output supplied from the 1/N frequency divider with that of a reference frequency signal supplied from the reference frequency oscillator (OSC) 3c, and a filter 3e for receiving an output signal from the phase comparator 3d and supplying a control voltage corresponding to a phase difference to the VCO 3a. Numeral 4 denotes an FM wave detector for FM-wave-detecting an intermediate frequency signal supplied from the front end 2 and outputting an FM wave detection signal, 5 denotes a filter for passing a signal component (stereo composite signal) of 53 KHz or lower from within an output signal of the FM wave detector 4, 6 denotes a stereo demodulation circuit for stereo-demodulating a signal passing through the filter 5, 7 denotes a band pass filter having a central frequency of 76 KHz for extracting multiplex information from an output signal of the FM wave detector 4, 8 denotes a multiplex signal demodulating section for performing MSK (Minimum Shift Keying) demodulation processing for a signal passing through the band pass filter 7, 9 denotes a synchronization circuit section for synchronously regenerating a demodulated multiplex signal, 10 denotes an error correcting section for detecting and correcting an error of a synchronously-regenerated signal, 11 denotes a multiplex signal processing section for processing a demodulated multiplex signal to perform predetermined signal processing, 12 denotes an indicator to which the data processed by the multiplex signal processing section 11 is supplied, 13 denotes a control section for receiving a synchronous detection signal from the synchronization circuit 9 and supplying frequency-dividing-ratio data N to the 1/N frequency divider of the PLL circuit 3, and 14 denotes an operating section provided with a channel select command key and a band select key.

In this embodiment, an FM multiplex broadcast receiving circuit FMR comprises the band pass filter 7, multiplex signal demodulating section 8, synchronization circuit 9, error correcting section 10, and multiplex signal processing section 11.

Figure 2:
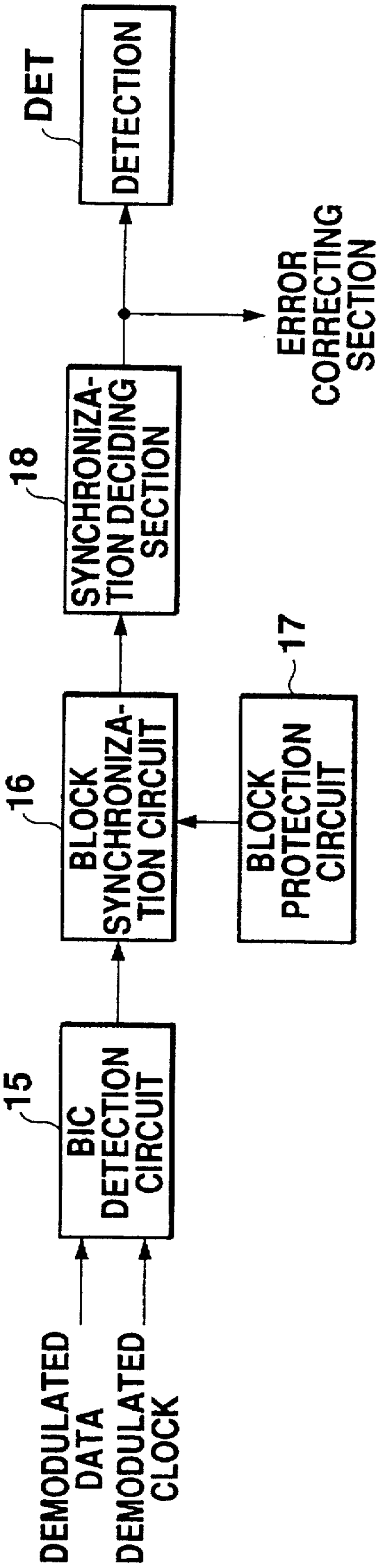
FIG. 2 is an illustration showing the structure of a synchronization circuit section.

FIG. 2 is an illustration showing an essential portion of the synchronization circuit section 9, in which numeral 15 represents a BIC detection circuit for detecting a BIC code (block identification code) included in demodulated data in accordance with the demodulated data and demodulated clock supplied from the multiplex signal demodulating section 8, 16 denotes a block synchronization circuit for performing block synchronization processing in accordance with an output of the BIC detection circuit 15, 17 denotes a block protection circuit for setting an allowable number of bit errors when block synchronization processing is performed by the block synchronization circuit 16, and 18 denotes a synchronization determination section for determining synchronism in accordance with an output of the block synchronization circuit 16 and supplying a decision output to the control section 13 and the error correcting section 10.

Operations of the embodiment shown in FIG. 1 are described below.

When channel selection is performed in accordance with the operation of the operating section 14 and a broadcast signal at a predetermined signal level is received, the broadcast signal received by the antenna 1 is converted into a predetermined intermediate-frequency signal in the front end 2 by using an oscillation signal (local oscillation signal) supplied from the VCO of the PLL circuit 3. Then, the intermediate frequency signal is FM-demodulated by the FM wave detector 4. An output signal from the FM wave detector 4 is supplied to the stereo demodulation circuit 6 through the filter 5 and moreover, supplied to the multiplex signal demodulation circuit 9 through the band pass filter 7. The signal passing through the filter 5 (that is, a stereo composite signal) is stereo-demodulated by the stereo demodulation circuit 6 and output as an L signal and a R signal.

The signal passing through the band pass filter 7 is supplied to and demodulated by the multiplex signal demodulating section 8. The multiplex signal demodulated by the multiplex signal demodulating section 8 is supplied to the synchronous circuit section 9. The synchronous circuit section 9 detects a BIC code included in demodulated data by using a demodulated clock, and then outputs an allowance signal to the synchronization determination section 18 when, compared to a predetermined BIC code, the detected BIC code has a number of error bits equal to or less than a predetermined number of bits. When a signal is supplied to the synchronization deciding section 18 from the block synchronization circuit 16 up to a predetermined number of times, the determination section 18 determines that synchronization has been established and outputs a synchronization determined signal. The synchronization determined signal is supplied to a detecting section DET and moreover to the error detecting and correcting section 10. The detecting section DET detects that a signal currently being received is a multiplex broadcast signal in accordance with the supplied synchronization determined signal and supplies a detection signal to the control section 13. Moreover, the error detecting and correcting section 10 executes error detection and correction processing in accordance with the signal.

Figure 3:
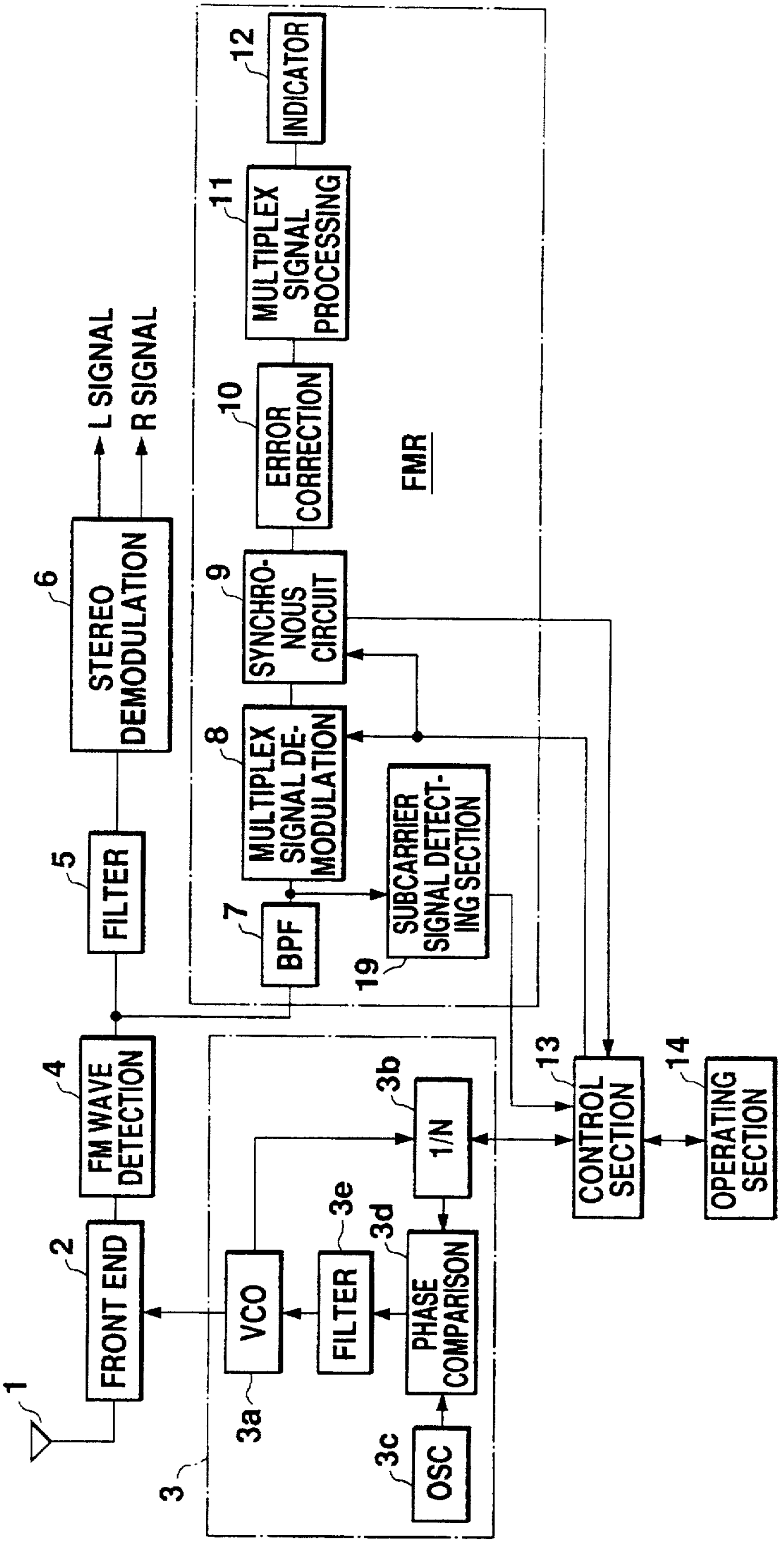
FIG. 3 is an illustration showing a second embodiment of the present invention.

FIG. 3 is an illustration showing the second embodiment which is provided with a subcarrier signal detecting section 19 to which an output of the band pass filter 7 in FIG. 1 is supplied. In this embodiment, the subcarrier signal detecting section also constitutes the FM multiplex broadcast receiving circuit FMR.

Figure 4:
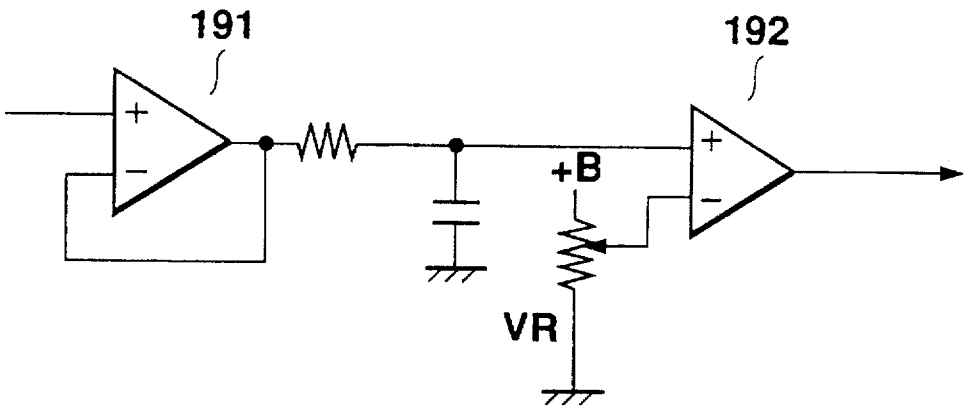
FIG. 4 is an illustration showing a structure of a subcarrier signal detecting section.

FIG. 4 is an illustration showing a structure of the subcarrier signal detecting section 19 for detecting the level of a subcarrier signal, which comprises an integration circuit 191 and a decision circuit 192 for generating a determination signal by comparing an output of the integration circuit 191 with a reference signal VR. The value of the reference signal Vref is changed in accordance with the level of an L-R signal of a stereo composite signal when a multiplex broadcast signal is L-MSK-modulated.

Figure 5:
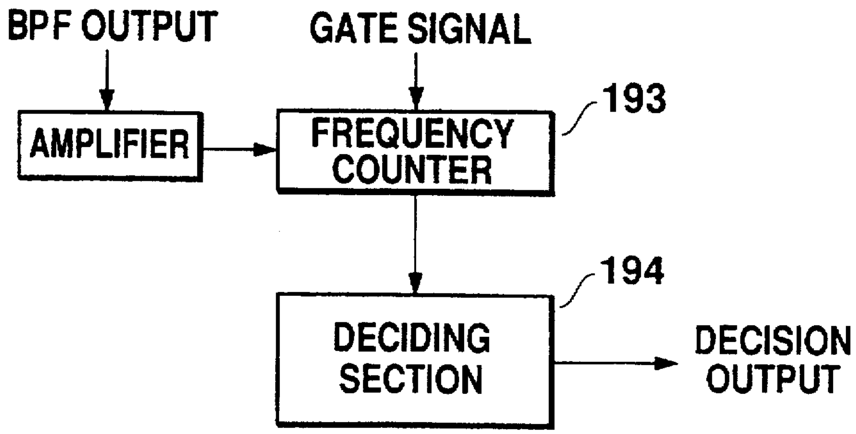
FIG. 5 is an illustration showing another structure of the subcarrier signal detecting section.

FIG. 5 is an illustration showing a structure of the subcarrier signal detecting section 19 for detecting the frequency of a subcarrier signal, which comprises a counter 193 set to an operational state for a predetermined time by a gate signal supplied from the control section 13, and which counts the frequency of a signal passing through the band pass filter 7 during operation, and a deciding section 194 for deciding whether a signal with a predetermined frequency is received or not in accordance with a value counted by the counter 193.

According to the embodiment in FIG. 3, when a broadcast wave signal is received under the control of the control section 13, it is first detected by the subcarrier signal detecting section 19 whether a signal passing through the band pass filter 7 includes a subcarrier signal or not.

That is, in the case of the circuit in FIG. 4, a signal passing through the band pass filter is integrated and thereafter compared with the reference signal VR. When an integration circuit 191 output is larger than the reference signal VR, an H-level detection signal is supplied to the control section 13 and the control section 13 temporarily determines that a multiplex signal is present in accordance with the H-level detection signal and supplies an operation signal to the multiplex signal demodulating section 8 and/or the synchronous circuit section 9 to make the sections 8 and/or 9 perform synchronization processing of received data. As a result, when block synchronization is determined and a determination signal is supplied from the synchronization determination section 18, the control section 13 determines that a currently-received broadcast signal is a multiplex broadcast.

However, when the presence of a subcarrier signal is not detected by the subcarrier signal detecting section 19, the control section 13 determines that no multiplex signal is present and therefore, it does not demodulate a multiplex signal.

The circuit in FIG. 5 is only different from the circuit in FIG. 4 in that it is temporarily determined that a multiplex signal is present when a value counted within a predetermined time is kept in a predetermined range and it is determined that no multiplex signal is present when the value is out of the range.

Figure 6:
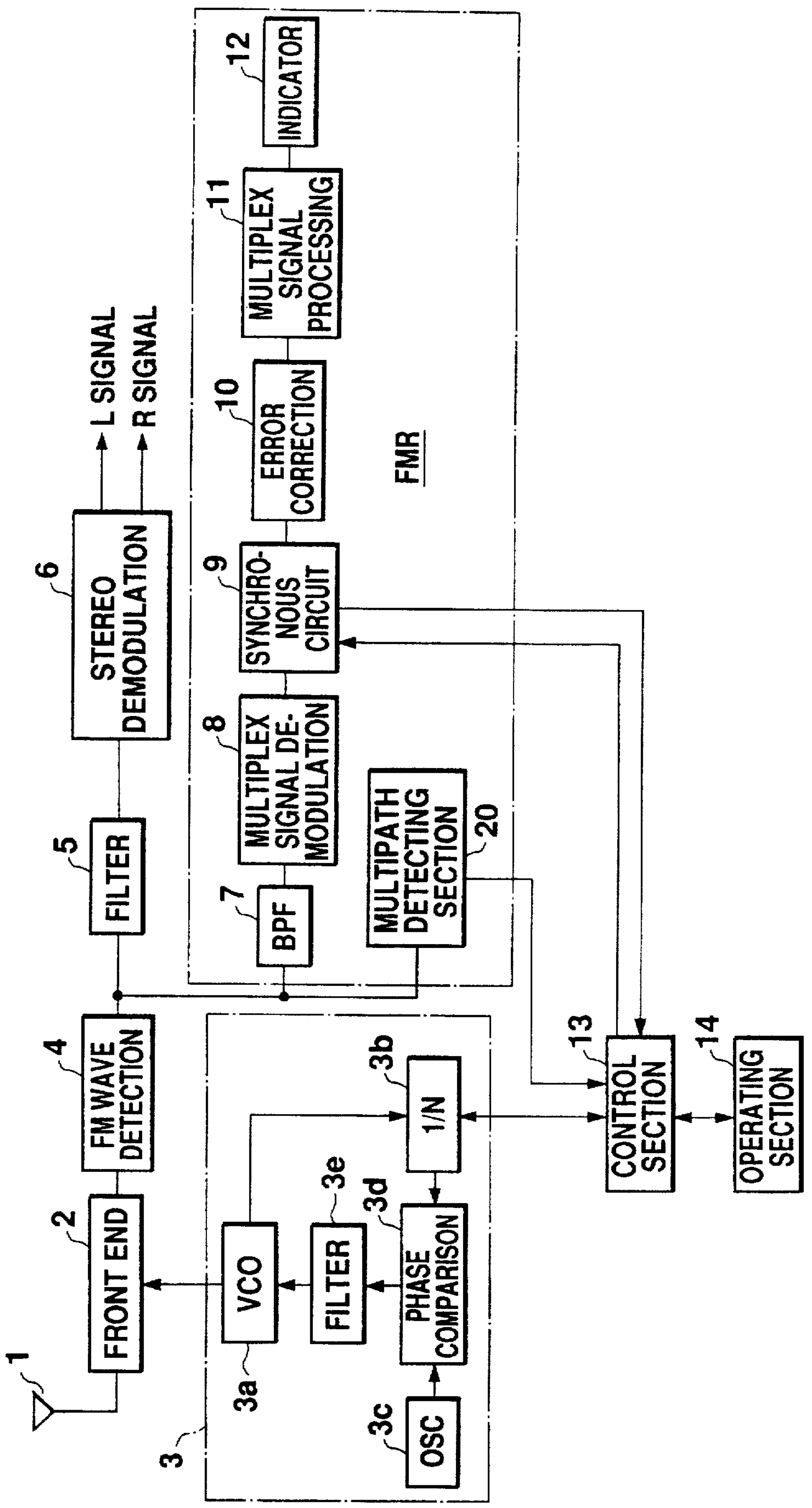
FIG. 6 is an illustration showing a third embodiment of the present invention.
Figure 7:
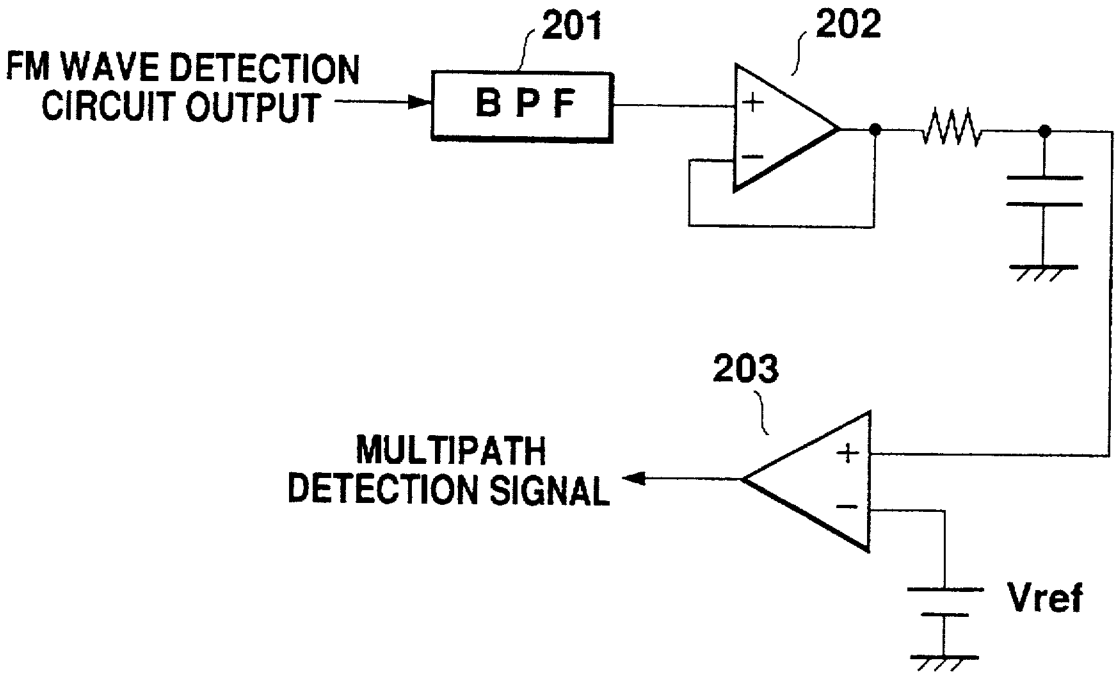
FIG. 7 is an illustration showing a structure of a multipath detecting section.

FIG. 6 is an illustration showing the third embodiment obtained by providing a multipath detecting section 20 for the embodiment in FIG. 1. In the case of this embodiment, the multipath detecting section 20 also constitutes the FM multiplex broadcast receiving circuit FMR. FIG. 7 is an illustration showing a definite example of the multipath detecting section 20, which comprises a band pass filter 201 having a central frequency of 57 KHz, an integration circuit 202 for integrating a signal passing through the band pass filter 201, and a decision circuit 203 for comparing an output of the integration circuit 202 with a reference value and outputting a multipath detection signal when an integrated output is equal to or larger than the reference value Vref.

In the embodiment in FIG. 6, the control section 13 supplies a control signal to the synchronization circuit 9 when a multipath is detected by the multipath detecting section 20, as well as decreasing an allowable number of bit errors set by the block protection circuit 17 and moreover lowering the probability of erroneous determination of block synchronization.

Figure 8:
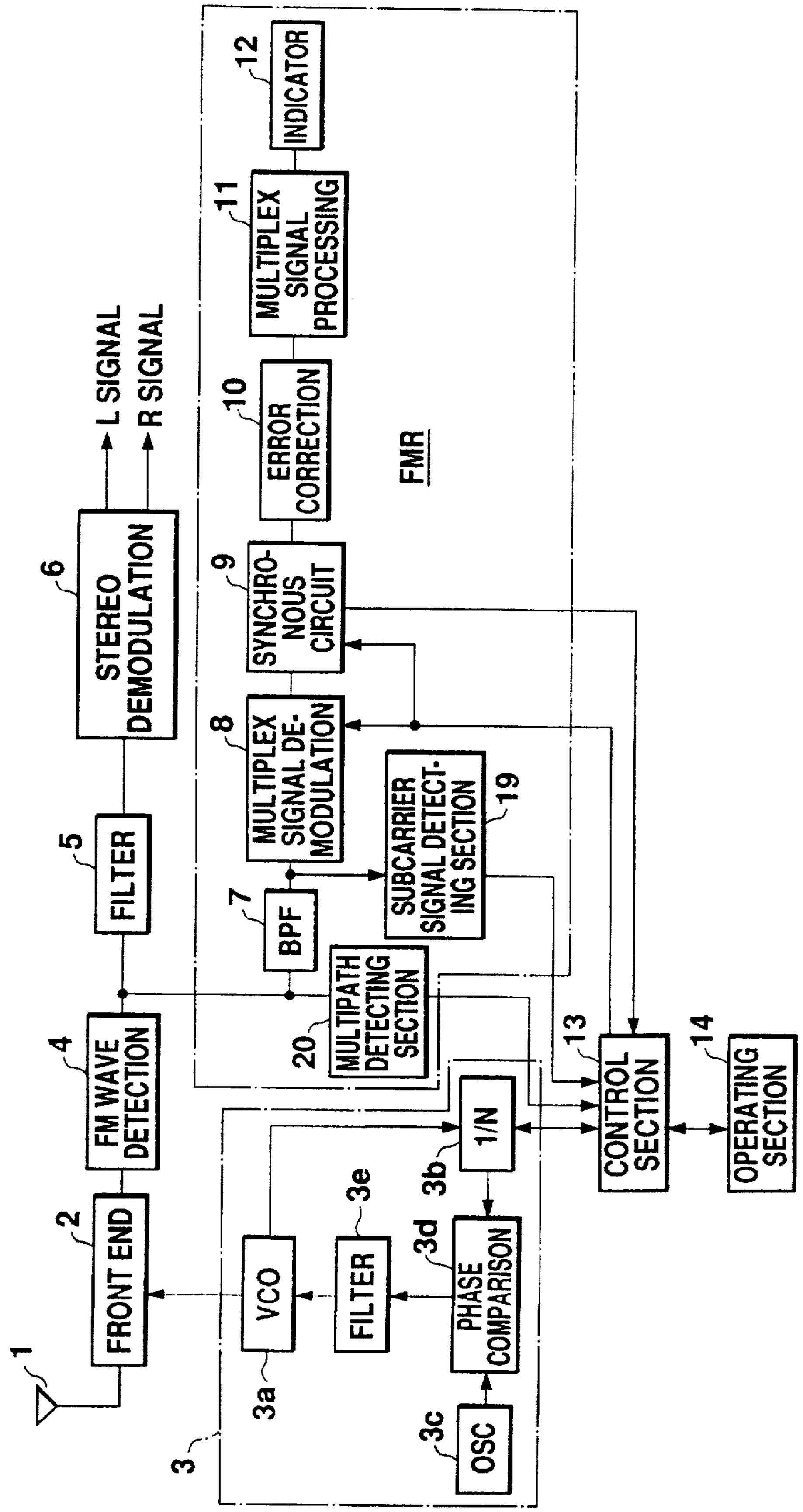
FIG. 8 is an illustration showing a fourth embodiment of the present invention.

FIG. 8 is an illustration showing the fourth embodiment obtained by providing the multipath detecting section 20 for the embodiment in FIG. 3.

In the embodiment in FIG. 8, the control section 13 stops the operation of the subcarrier signal detecting section 19 or ignores a detection output when a multipath is detected by the multipath detecting section 20, supplies a control signal to the synchronization circuit 9, decreases an allowable number of bit errors set by the block protection circuit 17, and lowers the probability of erroneous determination of block synchronization.

In this case, it is also possible to only stop or ignore the operation of detecting a subcarrier signal.

What is claimed is:

1. An FM multiplex broadcast receiving circuit for receiving an FM broadcast signal in which a digital information signal is superimposed on the FM broadcast signal, the FM multiplex broadcast receiving circuit comprising;

means for extracting a predetermined frequency band signal from an FM-wave-detected signal of the FM broadcast signal;

means for demodulating the predetermined frequency band signal so as to obtain a demodulated signal; and means for detecting, in response to the demodulated signal, whether the digital information is multiplexed in accordance with the predetermined frequency band signal by synchronously processing the demodulated signal to determine the presence of a code signal by comparing number of error bits in the code signal to a predetermined error number, wherein the means for detecting outputs a synchronization signal when the error bits are less than the predetermined error number which signifies the presence of the digital information signal multiplexed with the FM broadcast signal.

2. The FM multiplex broadcast receiving circuit according to claim 1, wherein the predetermined frequency band signal includes a subcarrier signal which is modulated by the digital information signal and wherein said means for detecting comprises first detection means for generating a first detection signal in accordance with the level of the subcarrier signal and second detection means for generating a second detection signal in accordance with a synchronous detection of said digital information signal.

3. The FM multiplex broadcast receiving circuit according to claim 2, wherein said second detection means performs the detection when the presence of a multiplex information signal is detected by said first detection means.

4. The FM multiplex broadcast receiving circuit according to claim 1, wherein the predetermined frequency band signal includes a subcarrier signal which is modulated by the digital information signal and wherein said means for detecting comprises first detection means for generating a first detection signal based upon the presence of the subcarrier signal in a predetermined frequency range and second detection means for generating a second detection signal in accordance with a synchronous detection of said digital information signal.

5. The FM multiplex broadcast receiving circuit according to claim 4, wherein said second detection means performs the detecting operation when the presence of a multiplex information signal is detected by said first detection means.

6. An FM multiplex broadcast receiving circuit comprising:

means for detecting whether an FM broadcast signal includes multiplex information by synchronously processing a demodulated signal of the FM broadcast signal to determine the presence of a code signal by comparing number of error bits in the code signal to a predetermined error number;

multipath detection means for detecting the presence of a multipath component of the FM broadcast signal; and means for tuning the FM broadcast receiving circuit based upon detections of multiplex information and the presence of any multipath component of the FM broadcast signal.

7. The FM multiplex broadcast receiving circuit according to claim 6, wherein said means for detecting is controlled by a detection signal of said multipath detection means.

8. The FM multiplex broadcast receiving circuit according to claim 6, wherein the FM broadcast signal includes a subcarrier signal wherein said means for detecting detects the multiplex information by detecting the presence of said subcarrier signal within a predetermined frequency range.

9. The FM multiplex broadcast receiving circuit according to claim 6, wherein the FM broadcast signal includes a subcarrier signal, and wherein said multiplex information is representative of digital data and said means for detecting comprises first detection means for generating a first detection signal in accordance with the level of the subcarrier signal, and second detection means for generating a second detection signal in accordance with a synchronous detection of said digital data which occurs by determining the number of error bits in the code signal included in the demodulated signal.

10. The FM multiplex broadcast receiving circuit according to claim 9, wherein said second detection means performs the detecting operation when the presence of a multiplex information signal is detected by said first detection signal.

11. The FM multiplex broadcast receiving circuit according to claim 10, wherein multiplex information is detected in accordance with a detection result of second detection means when the presence of a multipath is detected by said multipath detection means.

12. The FM multiplex broadcast receiving circuit according to claim 6, wherein the FM broadcast signal includes a subcarrier signal, and wherein said multiplex information is representative of digital data and said means for detecting comprises first detection means for generating a first detection signal in accordance with whether the frequency of the subcarrier signal is kept in a predetermined frequency range and second detection means for generating a second detection signal in accordance with a synchronous detection of said digital data which occurs by determining the number of the error bits in the code signal included in the demodulated signal.

13. The FM multiplex broadcast receiving circuit according to claim 12, wherein said second detection means performs the detecting operation when the presence of a multiplex information signal is detected by said first detection means.

14. The FM multiplex broadcast receiving circuit according to claim 13, wherein multiplex information is detected in accordance with a detection result of second detection means when the presence of a multipath is detected by said multipath detection means.

15. The FM multiplex broadcast receiving circuit of claim 1, wherein the predetermined frequency band signal includes a subcarrier signal which is modulated by the digital information signal, and wherein the detecting means further includes means for detecting the presence of the subcarrier signal, and wherein the synchronization signal is selectively enabled when the presence of the subcarrier signal is detected.

16. The FM multiplex broadcast receiving circuit of claim 1, wherein the means for detecting further includes means for detecting a multipath component of the FM broadcast signal, and wherein the predetermined error number used for generating the synchronization signal is adjusted upon detection of the multipath component.

17. An FM multiplex broadcast receiving circuit for receiving an FM broadcast signal in which a digital information signal is superimposed on the FM broadcast signal, the FM multiplex broadcast receiving circuit comprising:

an FM wave detector for FM-wave-detecting the received FM broadcast signal;

a filter for extracting a predetermined frequency band signal from an output signal of the FM wave detector;

a demodulating circuit coupled to the filter for demodulating the output signal of the FM wave detector so as to obtain a demodulated signal; and a detection circuit coupled to the demodulating circuit for detecting, in response to the demodulated signal, whether the digital information signal is multiplexed in accordance with the predetermined frequency band signal from the filter by synchronously processing the demodulated signal to determine the presence of a code signal by comparing number of error bits in the code signal to a predetermined error number, wherein the detection circuit outputs a synchronization signal when the error bits are less than the predetermined error number which signifies the presence of the digital information signal multiplexed with the FM broadcast signal.

18. The FM multiplex broadcast receiving circuit according to claim 17, wherein the predetermined frequency band signal includes a subcarrier signal which is modulated by the digital information signal and wherein said detection circuit comprises a first detector for generating a first detection signal in accordance with the level of the subcarrier signal and a second detector for generating a second detection signal in accordance with a synchronous detection of said digital information signal.

19. The FM multiplex broadcast receiving circuit according to claim 18, wherein said second detector performs the detection operation when the presence of a multiplex information signal is detected by said first detector.

20. The FM multiplex broadcast receiving circuit according to claim 17, wherein the predetermined frequency band signal includes a subcarrier signal which is modulated by the digital information signal and wherein said detection circuit comprises a first detector means for generating a first detection signal based upon the presence of the subcarrier signal in a predetermined frequency range and a second detector for generating a second detection signal in accordance with synchronous detection of said digital information signal.

21. The FM multiplex broadcast receiving circuit according to claim 20, wherein said second detector performs the detection operation when the presence of a multiplex information signal is detected by said first detector.

22. The FM multiplex broadcast receiving circuit of claim 19, wherein the predetermined frequency band includes a subcarrier signal which is modulated by the digital information signal, wherein the detection circuit further includes a subcarrier detection circuit for detecting the presence of the subcarrier signal, and wherein the synchronization signal is selectively enabled when the presence of the subcarrier signal is detected.

23. The FM multiplex broadcast receiving circuit of claim 19, wherein the detection circuit further includes a multipath detection circuit coupled to the FM wave detector for detecting a multipath component of the FM broadcast signal, and wherein the predetermined error number used for generating the synchronization signal is adjusted upon detection of the multipath component.

24. An FM multiplex broadcast receiving circuit comprising:

a multiplex information detection circuit for detecting whether an FM broadcast signal includes multiplex information by synchronously processing a demodulated signal of the FM broadcast signal to determine the presence of a code signal by comparing number of error bits in the code signal to a predetermined error number;

a multipath detection circuit for detecting the presence of a multipath component of the FM broadcast signal; and a tuner for tuning the FM broadcast receiving circuit based upon detections of the multiplex information and the presence of any multipath component of the FM broadcast signal.

25. The FM multiplex broadcast receiving circuit according to claim 24, wherein said multiplex information detection circuit is controlled by a detection signal of said multiplex detection circuit.

26. The FM multiplex broadcast receiving circuit according to claim 24, wherein the FM broadcast signal includes a subcarrier signal wherein said multiplex information detection circuit detects the multiplex information by detecting the presence of said subcarrier signal within a predetermined frequency range.

27. The FM multiplex broadcast receiving circuit according to claim 24, wherein the FM broadcast signal includes a subcarrier signal and wherein said multiplex information is representative of digital data and said multiplex information detection circuit comprises a first detector for generating a first detection signal in accordance with the level of the subcarrier signal, and a second detector for generating a second detection signal in accordance with a synchronous detection of said digital, data which occurs by determining the number of the error bits in the code signal included in the demodulated signal.

28. The FM multiplex broadcast receiving circuit according to claim 27, wherein said second detector performs the detection operation in response to the first detection signal.

29. The FM multiplex broadcast receiving circuit according to claim 28, wherein multiplex information is detected in accordance with a detection result of the second detector when the presence of a multipath component of the FM broadcast signal is detected by the multipath detection circuit.

30. The FM multiplex broadcast receiving circuit according to claim 24, wherein the FM broadcast signal includes a subcarrier signal, and wherein said multiplex information signal is representative of digital data and said multiplex information detection circuit comprises a first detector for generating a first detection signal based upon whether the frequency of the subcarrier signal is kept in a predetermined frequency range, and a second detector for generating a second detection signal in accordance with a synchronous detection of said digital data which occurs by determining the number of the error bits in the code signal included in the demodulated signal.

31. The FM multiplex broadcast receiving circuit according to claim 30, wherein said second detector performs the detection operation when the presence of a multiplex information signal is detected by said first detector.

32. The FM multiplex broadcast receiving circuit according to claim 31, wherein multiplex information is detected in accordance with a detection result of the second detector when the presence of a multipath component of the FM broadcast signal is detected by said multipath detection circuit.

33. The FM multiplex broadcast receiving circuit according to claim 1, the receiving circuit further comprising multipath detection means for detecting a multipath component of the FM broadcast signal, wherein the means for detecting determines whether the digital information is multiplexed based upon predetermined criteria, the predetermined criteria being adjusted in response to detections of the multipath component of the FM broadcast signal.

34. The FM multiplex broadcast receiving circuit according to claim 1, the FM multiplex broadcast receiving circuit further comprising:

multipath detection means for detecting a multipath component of the FM broadcast signal; and subcarrier detection means for detecting the presence of a subcarrier in the predetermined frequency band, wherein, in the absence of detections of a multipath component of the FM broadcast signal, the means for detecting determines whether the digital information is multiplexed in accordance with the predetermined frequency band signal based upon detections of the presence of the subcarrier.

35. The FM multiplex broadcast receiving circuit of claim 17, the FM multiplex broadcast receiving circuit further comprising:

a multipath detection circuit for detecting a multipath component of the FM broadcast signal, wherein the detection circuit determines whether the digital information is multiplexed based upon predetermined criteria, the predetermined criteria being adjusted in response to detections of the multipath component of the FM broadcast signal.

36. The FM multiplex broadcast receiving circuit according to claim 17, the FM multiplex broadcast receiving circuit further comprising:

a multipath detection circuit for detecting a multipath component of the FM broadcast signal; and a subcarrier detection circuit for detecting the presence of a subcarrier in the predetermined frequency band, wherein, in the absence of detections of a multipath component of the FM broadcast signal, the means for detecting determines whether the digital information is multiplexed in accordance with the predetermined frequency band signal based upon detections of the presence of the subcarrier.

* * * * *